United States Patent [19]

Porth et al.

[11] Patent Number: 4,742,711

[45] Date of Patent: May 10, 1988

[54] ARRANGEMENT HAVING AN AIR-MASS METER FOR AN INTERNAL COMBUSTION ENGINE

[75] Inventors: Wolfgang Porth, Frankfurt am Main; Wolfgang Weibler; Eckhardt Kern, both of Hofheim a. T.; Thomas Hannewald, Griesheim; Reiner Weingärtner, Hofheim a. T., all of Fed. Rep. of Germany

[73] Assignee: VDO Adolf Schindling AG, Frankfurt am Main, Fed. Rep. of Germany

[21] Appl. No.: 926,375

[22] Filed: Oct. 31, 1986

[30] Foreign Application Priority Data

Nov. 2, 1985 [DE] Fed. Rep. of Germany ....... 3539013

[51] Int. Cl.⁴ ............................................. G01M 15/00
[52] U.S. Cl. .................................................. 73/118.2
[58] Field of Search ...................... 73/118.1, 118.2, 204

[56] References Cited

U.S. PATENT DOCUMENTS

| | | | |
|---|---|---|---|
| 3,965,730 | 6/1976 | Innes | 73/118.2 |
| 4,299,121 | 11/1981 | Asayama et al. | 73/118.1 |
| 4,375,204 | 3/1983 | Yamamoto | 73/118.2 |
| 4,418,568 | 12/1983 | Surman | 73/204 |
| 4,445,368 | 5/1984 | Sumal | 73/204 |
| 4,446,824 | 5/1984 | Endo et al. | 73/118.1 |
| 4,457,169 | 7/1984 | Lauterbach et al. | 73/204 |
| 4,478,087 | 10/1984 | Asayama et al. | 73/118.1 |
| 4,495,802 | 6/1985 | Kashiwaya et al. | 73/204 |
| 4,527,423 | 7/1985 | Sato et al. | 73/118.2 |

FOREIGN PATENT DOCUMENTS

| | | | |
|---|---|---|---|
| 0066716 | 5/1980 | Japan | 73/204 |
| 0075544 | 6/1980 | Japan | 73/118.2 |
| 0100720 | 6/1980 | Japan | 73/204 |

Primary Examiner—Stewart J. Levy
Assistant Examiner—Robert R. Raevis
Attorney, Agent, or Firm—Martin A. Farber

[57] ABSTRACT

In an arrangement having an air-mass meter for an internal combustion engine, the measurement place of the air-mass meter is arranged within a flow channel which has at least one curved section and one straight section and connects the interior of an air filter with a hollow space connected to the intake opening of the internal combustion engine; the measurement place is arranged in the straight portion of the flow channel. The arrangement of the invention permits a compact construction and, due to its long flow channel, a high degree of precision of the measurement of the mass of air.

21 Claims, 1 Drawing Sheet

ARRANGEMENT HAVING AN AIR-MASS METER FOR AN INTERNAL COMBUSTION ENGINE

FIELD AND BACKGROUND OF THE INVENTION

The invention concerns a system having an air-mass meter for an internal combustion engine in which the measurement place of the air-mass meter is located in a measurement tube.

For the regulating of internal combustion engines with fuel injection, it is necessary to measure the mass of air drawn in by the engine. Mechanical systems for this purpose are known which operate, for instance, with movable flaps or aperture plates which extend into the stream of air. Sensors are also known, for instance hot-wire air-mass meters, for the meaurement of the mass of air. They have the advantage that they have no moving parts and interfere less with the flow of air than the mechanical systems do. Furthermore, the result of the measurement is independent of differences in altitude, which is not true of the mechanical systems, which primarily measure the quantity of air.

Various different methods have been employed for the arrangement of the air-mass or air-quantity meters. Thus it is known, for instance, structurally to connect an air-mass meter operating by ultrasonics to an air filter. In this case, the measurement place of the air-mass meter is arranged within a short measurement tube which is concentric to the air filter. Due to the short length of the measurement tube, however, conditions of air flow at the measurement place are suitable only within limits, the limitation of suitable air flow being found under different operating conditions with the same mass flow. Therefore, the accuracy of the measurement does not meet all requirements.

It is therefore an object of the present arrangement to provide an arrangement with an air-mass meter in which suitable conditions of flow are assured within the meaurement tube, so that more accurate measurement results are obtained. The arrangement having the air-mass meter should be economical to manufacture, operate reliably and be suitable with respect to the space required as well as its ease of maintenance, for installation on an internal combustion engine, particularly that of an automotive vehicle.

SUMMARY OF THE INVENTION

According to the invention, the meaurement tube is developed as a flow channel (14) which has at least one curved section, two such sections (24, 26) being in a preferred embodiment, and one straight section (25) and connects the interior (4) of an air filter (1) with a hollow space (6) connected to the intake opening of the internal combustion engine, and the measurement place (15) is located in the straight portion of the flow channel.

By the arrangement in accordance with the invention, suitable conditions of flow at the measurement place and thus an accurate result of the measurement are obtained. The arrangement in accordance with the invention is furthermore of a compact construction which takes up little space.

Further, the interior (4) of the air filter (1) and the hollow space (6) can each have the shape substantially of a flat cylinder and be separated from each other by a division wall (7).

In accordance with a further development, a first curved section (24) of the flow channel (14) is connected with an opening in the division wall which forms the inlet opening (17) of the flow channel (14), a straight section (25) which extends at least partially within the hollow space (6) adjoins the first curved section (24) of the flow channel (14), and a second curved section (26) is arranged behind the straight section (25) and debouches into the hollow space (6).

Another straight section (27) can be arranged behind the second curved section (20) and debouches substantially tangentially into the hollow space (6).

Also, the section (26, 27) debouching into the hollow space can have an outlet opening (19) the plane of which forms an acute angle with the axis of the section (26, 27) at the outlet opening (17).

Further, the inlet opening (17) of the flow channel (14) can protrude out of the division wall (7) and terminate in collar shape.

A particularly compact construction is obtained by arranging in the hollow space (6) a fuel-injection valve (8) whose nozzle (9) faces a tube (10) which contains a throttle flap (11) and leads to the internal combustion engine.

In order to prevent parts of the injected mist of fuel coming directly into the intake channel of the engine rather than first passing into the hollow space, the tube (10) which leads to the internal combustion engine can, in accordance with another feature, extend in funnel shape into the hollow space (6).

For the better conducting of the air within the hollow space, guide elements (13) can be arranged in the region of the nozzle (9).

One advantageous feature of the arrangement in accordance with the invention is that the hollow space (6) is enclosed by a housing (5) on which the division wall (7) and the air filter (1) can be placed.

In order to be able to use compact air filters which have proven their suitability, the interior (4) of the air filter (1) and the hollow space (6) can each have the shape of a flat cylinder, in accordance with another embodiment of the invention.

Also, the fuel-injection valve (8) and the tube (10) can be arranged asymmetrically.

Further, the division wall (7) can be airtight.

Other features of the invention provide for a hydraulically favorable development of the flow channel, namely in the manner that the area of the inlet opening greater than the cross-sectional area of the flow channel, that within this region of the inlet opening the flow channel extends in a plane which intersects the division wall at an acute angle and/or that the flow channel (14) contains a flow straightener (18) in the vicinity of its inlet opening (17) and a protective grid (20) in the vicinity of its outlet opening (19). Furthermore, in order to improve the flow in the vicinity of the sensor the diameter of the flow channel can be smaller at the place of measurement than at the outlet opening.

Further, the flow channel (14) can be developed as a Venturi nozzle within the narrowest cross section of which the measurement place (15) is provided.

Although the invention is directed primarily at the use of thermal sensors at the measurement place, for instance hot-wire sensors, the advantageous use of other sensors, for instance ultrasonic sensors, is entirely possible.

For the operation of the sensors in question, electric circuits are required which are preferably arranged in the vicinity of the sensor. In accordance with further features of the invention, the electric circuit (16) associated with the sensor (15) is arranged in the vicinity of the sensor on the division wall (7). The necessary cooling of the electric circuit can be effected either by the filtered intake air or in the manner that the division wall serves as cooling member if—in accordance with another feature of the invention—the electric circuit (16) is in heat-conductive connection with the division wall (7).

Finally, it is possible to arrange additional electric circuits (22) on the division wall (7) in the inside of the air filter, for instance a control circuit which evaluates the signals of the air-mass meter and possibly other sensors. In such case, in addition to the advantage of the cooling, there is also the further advantage that different elements which belong to a control system and thus functionally belong together are also physically arranged within one structural unit.

BRIEF DESCRIPTION OF THE DRAWINGS

With the above and other objects and advantages in view, the present invention will become more clearly understood in connection with the detailed description of preferred embodiments, when considered with the accompanying drawing, of which.

Identical parts have been provided with the same reference numbers in the figures.

DETAILED DESCRIPTION OF THE PREFERRED EMBODIMENT

Figure 1:
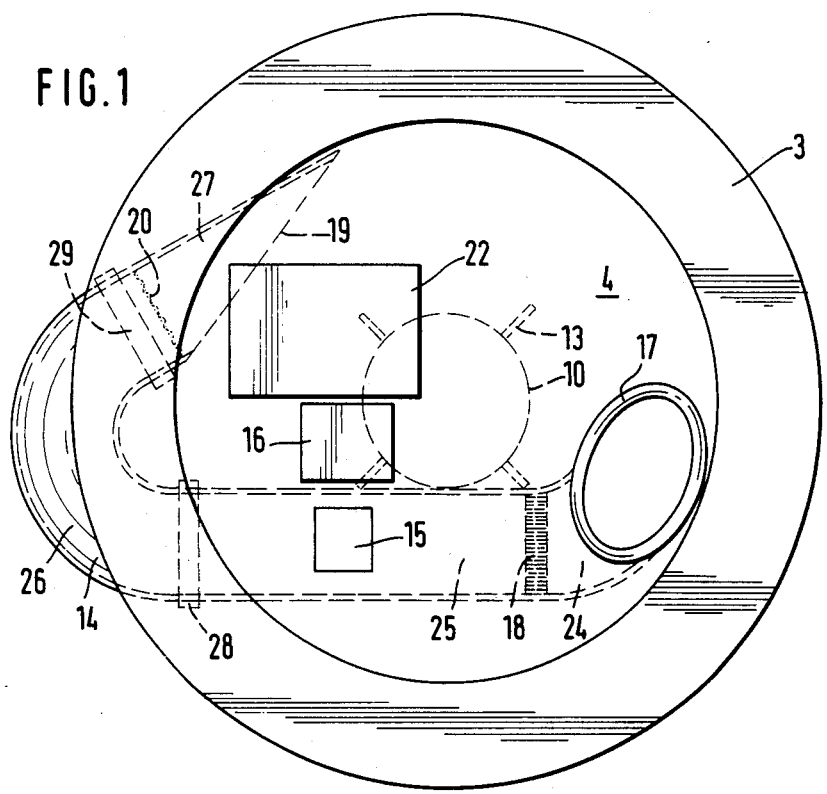
FIG. 1 is a plan view of the arrangement of the invention.

The air filter 1 having a housing 2 is a known air filter having the shape of a flat cylinder, such as is used in, by far, most gasoline engines. Instead of a pipe connection for the intake connection it is, however, open at the bottom. However, it is closed off by a division wall 7 which separates the interior 4 of the filter from the hollow space lying below it, which hollow space will be described in further detail below. In the figure, the ring-shaped filter material 3 itself is shown merely diagrammatically.

The housing 5, which bears the air filter 1 and the division wall 7, is connected to a pipe 10 which forms the intake port of the internal combustion engine, not shown. The throttle valve 11 is arranged within the pipe 10. An injection valve 8 located above the inlet opening of the pipe 10 injects the fuel into the air which enters directly into the pipe 10. In order that a part of the particles of fuel sprayed by the nozzle 9 do not pass into the region of the air which does not flow directly into the pipe 10, a funnel-shaped widening 12 of the pipe 10 can be provided. Guide elements 13 contribute to streamlining and uniformly distributing the flow in the space in front of the nozzle 9.

For the sake of clarity of the drawing a mounting for the injection valve within the housing 5 has not been shown. However, any man skilled in the art can design such a mounting.

The injection valve 8 can be combined as a single unit with a system pressure regulator 21, which is known per se. Conduits are provided for the feeding and return of the fuel, but they have not been shown in the drawing.

The hollow space 6 of the housing 5 forms a pulsation-damping space. As is known, in piston-type internal combustion engines the intake takes place in pulsating fashion. This pulsation makes itself noticeable throughout the entire intake system. For an accurate measurement of the mass of air, however, uniform flow is required within the air-mass meter; the pulsation therefore falsifies the result of the measurement.

The division wall 7 has an opening through which the inlet opening 17 of the flow channel 14 extends into the interior of the air filter 1.

The edge of the inlet opening 17 terminates in collar shape in order to improve the flow conditions. The flow channel 14 passes obliquely through the division wall 7 whereby an enlargement of the entrance opening 17 is obtained, which also contributes to improving the conditions of flow.

Figure 2:
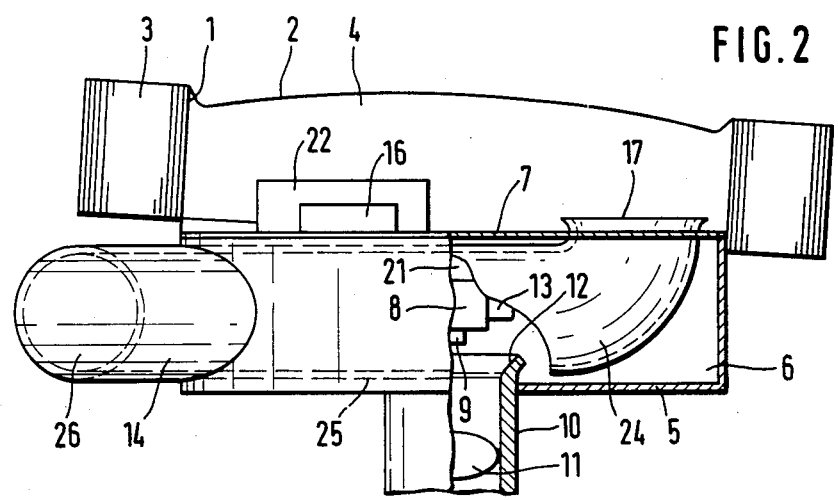
FIG. 2 is a longitudinal section of the embodiment.

Depending on the requirements in the specific case, the flow channel can be produced of an upper half and a lower half integral with the division wall 7 and the housing 5. It may, however, also be advisable to manufacture the flow channel in individual parts corresponding to the sections mentioned above and assemble them. Thus, for instance, a place of separation is provided in FIG. 1 between the sections 25 and 26 as well as between the sections 26 and 27, while the sections 24 and 25 consist of a single piece. FIG. 2 is based on a sinlge-piece flow channel.

In the vicinity of the outlet opening 19 a protective grid 20 is provided while a flow straightener 18 is arranged at the inlet opening 17, it consisting, in known manner, of a plurality of channels formed in a block of material.

The flow channel 14 can have a smaller cross-sectional area in the region of the sensor 15 than elsewhere, the transitions taking place gradually. In order to avoid deposits of impurities on the sensor 15, a bar-shaped shield, which is parallel to the sensor 15, can be arranged in known manner in front of the sensor 15 to protect the sensor 15.

As already stated above, different types of sensors can be used in the arrangement of the invention. One preferred embodiment of the sensor 15 consists of a thermal sensor in which a wire stretched out in the flow channel or a conductor arranged on an insulating board is traversed by current so that they definitely heat up to above the temperature of the air which flows past. By means of the temperature-dependent resister, the temperature of the conductor can be brought to a constant value in an electric circuit 16, a larger or smaller current flowing through the conductor depending on the mass of air which flows past. In order to compensate for the influence of the temperature of the air, a comparison conductor can be arranged in the vicinity of the electrically heated measurement conductor, only a small amount of current flowing through the comparison conductor so that its temperature corresponds practically to the temperature of the air.

For the purpose of the electrical connections of the sensor 15 to the corresponding electric circuit 16, said circuit is arranged in the immediate vicinity of the sensor 15. It has proven particularly favorable here to arrange the electric circuit 16 within the air filter and fasten it to the division wall 7. In such case, the air drawn in through the filter 1 serves for the cooling of the electric circuit 16, and, with good thermal contact between the circuit 16 and the division wall 7, the effective cooling surface for giving off heat to the air is substantially increased.

Aside from the electric circuit 16, there can also be provided in the interior 4 of the air filter 1 another circuit 22 which is connected to the circuit 16. The circuit 22 contains the known circuits necessary for electronic injection control. By the provision of the additional circuit 22 in this region on the division wall 7, not only is good cooling obtained but the passage of the line between the circuit 16 and the circuit 22 as well as the injection valve 8 is considerably simplified. Furthermore, it is favorable for purposes of maintenance that the said three components of the injection control system be arranged within one structural group.

We claim:

1. In a system having an air-mass meter for an internal combustion engine having an intake opening, there being a place in said system for measurement by the air-mass meter located in a measurement tube, the system further comprising a housing defining an enclosure with a hollow space connected to the intake opening of the internal combustion engine, the improvement comprising an air filter having an interior; and wherein
said measurement tube is formed a a flow channel which has at least one curved section and one striaght section and connects said interior of said air filter with said hollow space, said flow channel extending in a plane normal to an axis of said intake opening thereby to reduce the height of said housing; and
said measurement place is located in said straight portion of said flow channel; and wherein
said interior of said air filter and of said enclosure are shaped substantially as a flat cylinder, said system further comprising
a divisional wall separating said interior of the said air filter from the interior of said enclosure, said housing and said divisional wall extending traversely of said intake opening, a cross section of said measurement tube being commensurate with said intake opening, said measurement tube lying outside of and substantially circumscribing said intake opening to provide an elongated passage for air between said filter and said intake opening, the configuration of said measurement tube constraining air to flow parallel to said plane.

2. The system according to claim 1, wherein
said divisional wall and said air filter are supported by said housing.

3. The system as set forth in claim 1, wherein
a first curved section of the flow channel is connected with an opening in said division wall to form an inlet opening of said flow channel; and wherein
said straight section extends at least partially within said hollow space and adjoins said first curved section of the flow channel, and
a second curved section of said flow channel connects between a downstream end of said straight section and the hollow space.

4. The system according to claim 3, further comprising
a flow straightener in the flow channel in the vicinity of said inlet opening.

5. The system as set forth in claim 3, further comprising
a further straight section of said flow channel connecting downstream of said second curved section and substantially tangentially connecting into said enclosure with the hollow space.

6. The system as set forth in claim 4, wherein
said further straight section has a longitudinal axis, and a connection of said further straight section with said enclosure of the hollow space is accomplished by an outlet opening inclined at an acute angle with the axis of said further straight section.

7. The system as set forth in claim 3, further comprising
tubular means having a longitudinal axis for connecting said second curved section with said enclosure of the hollow space by an outlet opening inclined at an acute angle to said longitudinal axis.

8. The system according to claim 7, further comprising
a protective grid located in the flow channel in the vicinity of said outlet opening.

9. The system as set forth in claim 1, wherein
said flow channel includes an inlet opening which projects out of said division wall and terminates in a collar shape.

10. The system according to claim 9, wherein
said divisional wall is airtight.

11. The system as set forth in claim 1, further comprising
a fuel-injection valve arranged in said hollow space;
a further tube leading from said enclosure of the hollow space to the internal combustion engine;
a throttle valve in said further tube; and wherein
said fuel-injection valve has a nozzle facing said further tube.

12. The system according to claim 11, wherein
said fuel injection valve and said further tube are arranged asymmetrically relative to said measurement tube.

13. The system as set forth in claim 11, wherein
said further tube extends in funnel shape into said hollow space.

14. The system as set forth in claim 11, further comprising
guide elements arranged in the vicinity of said nozzle.

15. The system according to claim 1, wherein
the interior of said air filter and said enclosure each have the shape of a flat cylinder.

16. The system according to claim 1, wherein
said flow channel includes a Venturi nozzle having a constriction, said measurement place being located at said constriction.

17. The system according to claim 1, wherein
said air-mass meter is a sensor located at said measurement place.

18. The system according to claim 17, wherein
said sensor is a thermal sensor.

19. The system according to claim 17, further comprising
an electric circuit operable with said sensor and located in the vicinity of said measurement place and on said divisional wall.

20. The system according to claim 19, wherein
said electric circuit is thermally coupled to said divisional wall.

21. The system according to claim 19, further comprising
an additional electric circuit for electronic fuel injection of said engine, said additional circuit being located on said divisional wall in the interior of said air filter.

* * * * *